3,459,773
PROCESS FOR PRODUCING α-TOCOPHEROL
AND ITS ESTERS
Tatsuo Moroe, Musashino, and Satohiko Hattori, Akira Komatsu, Takeshi Matsui, and Haruki Kurihara, Tokyo, Japan, assignors to Takasago Perfumery Co., Ltd., Tokyo, Japan, a corporation of Japan
No Drawing. Filed Dec. 27, 1966, Ser. No. 604,566
Int. Cl. C07d 7/22
U.S. Cl. 260—345.5                                                4 Claims

ABSTRACT OF THE DISCLOSURE

α-Tocopherol is produced by reacting phytol or isophytol with trimethylhydroquinone in an inert solvent using a macroreticular strongly acid sulfonic type cation exchange resin, produced by suspension polymerization of a styrene-divinyl enzyme copolymer in the presence of a substance which is a good solvent for the monomers but a poor swelling agent for the polymer and sulfonating of the resulting polymer, as a catalyst.

---

The present invention relates to a process for producing α-tocophenol and its esters. More particularly, it relates to a process wherein phytol or isophytol and trimethylhydroquinone are condensed in the presence of a cation-exchange resin catalyst and moreover, the resulting α-tocophenol may be subsequently esterified as such, if desired.

As known processes of producing α-tocopherol from isophytol or phytol and trimethylhydroquinone, there are various processes, for instance, a process wherein zinc chloride is used for condensation of phytyl halogenide obtained by substituting the hydroxyl group of phytol or isophytol by halogen with trimethylhydroquinone [P. Karrer: Helv. Chim. Acta 21, 520, 820, 939, (1938)], another process wherein boron trifluoride is used (J. D. Surmatis: Japanese patent-publication No. 1,114/1957), a further process wherein phosphorus pentoxide is used for direct condensation of isophytol or phytol with trimethylhydroquinone as a condensation agent [F. Werder: U.S. Patent 2,230,659 (1941)], and a still another process wherein boron trifluoride is used as a condensation agent [O. Ehrmann: German Patent 1,015,446 (1958)].

Of these known processes, the former process has the disadvantage that it requires an additional step to convert phytol or isophytol to phytyl halogenide, whereas the latter process has the disadvantage that it requires the use of a large amount of condensation agent and also the use of a special solvent in order to carry out the reaction smoothly.

A principal object of the present invention is to condense phytol or isophytol with trimethylhydroquinone in the presence of a small amount of catalyst by use of a solvent which is readily available at a low cost and to obtain α-tocopherol of high purity at a yield equal to or higher than that of any of the known processes.

Another object of the invention is to obtain α-tocopheryl esters of high purity by esterification of the resulting α-tocopherol without being refined by such a method as distillation.

In order to achieve these objects, the present inventors have executed numerous experiments and laborious studies in regard to various kinds of catalyst and cause to the conclusion that a strongly acid cation-exchange resin is an effective and satisfactory catalyst. That is to say, when 30 g. to 100 g. of cation-exchange resin is used for 1 mol (296 g.) of isophytol or phytol and this mixture is heated with 1 mol (152 g.) of trimethylhydroquinone in the presence of a solvent inert to this reaction, α-tocopherol is obtained in an amount of 425 g. In this case, the cation-exchange resin used is sulfonic type strongly acid exchange resin which is available on the market, and it has also been found that Amberlyst–15 (a registered trade name and manufactured by Rohm and Haas Company in U.S.A.) is especially excellent which is macroreticular cation-exchange resin. For the reason, in the present invention this Amberlyst–15 is exclusively employed as a catalyst. "Amberlyst–15" is described in J.A.C.S., vol. 84, No. 2 (1962), pages 306–306, and I & E C Product Research and Development, vol. 1, No. 2 (1962), pages 140–144, and is a macroreticular (macroporous) sulfonic acid type cation exchange resin having pores of about 400 to 800 A. produced by suspension polymerization of a styrene-divinyl benzene copolymer in the presence of a substance which is a good solvent for the monomers but a poor swelling agent for the polymer and sulfonating the resulting polymer by conventional means. The amount of catalyst to be used depends upon the type of reaction. That is, this kind of condensation reaction is a dehydration reaction, so that if water is eliminated from the reaction system, the reaction speed becomes faster and consequently, the amount of catalyst to be used can be decreased. In this case, it is possible to make the amount of catalyst to be used within the range of 3 to 100 g. of catalyst to 1 mol (296 g.) of isophytol or phytol.

The reaction water lowers the activity of the catalyst, so that in the case of Amberlyst–15, use of a large amount of catalyst is required if no water is eliminated from the reaction system. In the case where the process of this invention is carried out on an industrial scale, it is desirable to eleminate the resulting water from the reaction system and to make the weight of the catalyst to be about one-tenth of that of the isophytol or phytol. The catalyst can be re-used after filtration. The kind of solvent also depends upon the type of reaction. That is to say, it is rational to use, as that which can very conveniently be used for eliminating water from reaction system, such a solvent that is able to form an azeotropic mixture with water, for example, trichloroethylene, benzene, toluene, xylene, or hexane. It is also possible, however, to use such substance as formic acid or acetic acid in the case a somewhat larger amount of catalyst is used. The reaction proceeds within the reaction temperature range of 50 to 140° C., but it is advantageous to carry out the reaction at the azeotropic temperature of the solvent to be used with water. The reaction time does depend upon the reaction temperature, but usually the reaction is completed in 3 to 7 hours. After the reaction is completed, the catalyst can be filtered off and the solvent can be recovered, thus crude α-tocopherol is obtained. In this case, the yield is over 90% (theoretical value). When this crude α-tocopherol is distilled, there is obtained refined α-tocopherol (purity more than 96%). However, if desired, it is also possible to obtain α-tocopheryl esters by directly esterifying the crude reaction product, i.e., α-tocopherol as such by reaction with acetic anhydride or succinic anhydride and then distilling the resulting product. Furthermore, since the above-mentioned catalysts are all extremely effective as a catalyst for esterification, they can also be employed to directly esterify the resulting α-tocopherol as such without eliminating the catalyst after the completion of the condensation reaction in the presence of the inert solvent.

As is quite clear from the foregoing explanation, according to the process of the present invention it is possible to produce α-tocopherol and its esters of high purity with a high yield in a simple manner and by means of simple apparatus, and, moreover, possible to re-use the catalyst once used. Therefore, the process of the present invention is extremely effective one from the viewpoint of the industry.

This invention is further described with reference to examples which are illustrative and not limitative thereof.

Example 1

50 g. of 2,3,5-trimethylhydroquinone and 10 g. of Amberlyst-15 were heated under reflux with 400 ml. of benzene in a stream of nitrogen gas and 100 g. of isophytol were added dropwise gradually during 2.5 hours at a temperature of 75° C. and this mixture was further refluxed for 4 hours at 80° C. The water formed in the course of this operation was azeotropically eliminated from the reaction system. After the reaction was completed, the catalyst was filtered off, and then the benzene was distilled off under a reduced pressure of 30 mm. Hg and the residue was distilled in a high vacuum. Thus, there was obtained 142 g. of light yellow tocopherol. This product had an absorbancy of $E_{1cm}^{1\%}$ (292 mμ) 73.0 (in anhydrous ethanol)

a refractive index of 1.5065 (20° C.), and purity of 98.6%.

Example 2

By using 100 g. of phytol, 400 ml. of toluene, and 5 g. of Amberlyst-15, the reaction and after-treatment were carried out as in Example 1. Thus, 141 g. of tocopherol with purity of 99.6% were obtained.

Example 3

100 g. of isophytol, 50 g. of trimethylhydroquinone and 15 g. of Amberlyst-15 were reacted as in Example 1. After the reaction was completed, 100 g. of succinic anhydride were added to the resulting product in the intact state without removing the benzene and catalyst. After reaction for 4 hours at 80° C., the reaction product was allowed to cool to room temperature and the excess succinic anhydride and catalyst were filtered off. Then the filtrate was concentrated to about 260 ml, and allowed to stand. Thus, 163 g. of succinic acid ester were obtained as white needle-shaped crystals which melt at 132 to 138° C.

Example 4

100 g. of isophytol, 50 g. of trimethylhydroquinone, and 5 g. of Amberlyst-15 were reacted with 400 ml. of xylene in the same way as in Example 1. After the reaction was completed, 140 ml. of acetic anhydride were added to the reaction product without eliminating the xylene and the catalyst, and the resulting mixture was refluxed for 2 hours. The mixture was then distilled after filtering of the catalyst, thus 148 g. of colorless and transparent tocopheryl acetate were obtained. This product had an absorbancy of $E_{1cm}^{1\%}$ (284 mμ) 42.0 (in anhydrous ethanol)

a refractive index of 1.4978 (at 20° C.), and purity of 98.5%.

Example 5

50 g. of trimethylhydroquinone, 30 g. of Amberlyst-15, and 400 ml. of acetic acid were mixed together, and 100 g. of isophytol were further dropped onto the mixture at 50° C., and then the resulting mixture was stirred for 3 hours at 50° C. Thereafter, the same operation as in the above example was repeated to obtain 132 g. of tocopherol.

Example 6

In reference to Example 5, the resulting product was further supplied with 140 ml. of acetic anhydride after the condensation reaction was over, and this resulting mixture was refluxed for 2 hours, then 740 g. of tocopheryl acetate were obtained.

What we claim is:

1. In a process of producing α-tocopherol by reacting a member selected from the group consisting of isophytol and phytol with trimethylhydroquinone in the presence of a catalyst and an inert solvent, the step which comprises carrying out said reaction in the presence of a strongly acid sulfonic acid type macroreticular cation exchange resin as the catalyst.

2. The process of claim 1 in which said macroreticular cation exchange resin is one obtained by suspension copolymerization of styrene and divinyl benzene in the presence of a substance which is a good solvent for the monomers but a poor swelling agent for the polymer and sulfonation of the resulting polymer.

3. In a process of producing α-tocopherol esters by reacting a member selected from the group consisting of isophytol and phytol with trimethylhydroquinone in the presence of a catalyst and an inert solvent to produce α-tocopherol and subsequently esterifying the resulting α-tocopherol as such, without being separated and refined, with a carboxylic acid anhydride, the step which comprises carrying out both the reaction to produce the α-tocopherol and the esterification of such α-tocopherol in the presence of a strongly acid sulfonic acid type macroreticular cation exchange resin as the catalyst.

4. The process of claim 3 in which said macroreticular cation exchange resin is one obtained by copolymerization of styrene and divinyl benzene in the presence of a substance which is a good solvent for the monomers but a poor swelling agent for the polymer and sulfonation of the resulting polymer.

References Cited

UNITED STATES PATENTS

| | | | |
|---|---|---|---|
| 2,411,969 | 12/1946 | Karrer et al. | 260—345.5 |
| 3,344,151 | 9/1967 | Nelan | 260—345.5 |
| 3,364,234 | 1/1968 | Schoenewaldt | 260—345.5 |

HENRY R. JILES, Primary Examiner

JOHN M. FORD, Assistant Examiner